(12) United States Patent
Tanaka

(10) Patent No.: US 6,935,601 B2
(45) Date of Patent: Aug. 30, 2005

(54) HOOK DEVICE

(75) Inventor: Tsutomu Tanaka, Tochigi-ken (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 10/679,392

(22) Filed: Oct. 7, 2003

(65) Prior Publication Data
US 2004/0124330 A1 Jul. 1, 2004

(30) Foreign Application Priority Data
Dec. 26, 2002 (JP) .......................... 2002-375934

(51) Int. Cl.$^7$ ................................ B60R 7/08
(52) U.S. Cl. ..................... 248/294.1; 248/292.13; 248/308; 224/282; 224/549; 224/553; 224/927
(58) Field of Search ................... 248/291.1, 294.1, 248/292.13, 306, 308; 228/282, 549, 553, 927

(56) References Cited

U.S. PATENT DOCUMENTS

| | | | | |
|---|---|---|---|---|
| 633,742 A | * | 9/1899 | Turner | 248/294.1 |
| 835,992 A | * | 11/1906 | Truax | 248/291.1 |
| 2,706,049 A | * | 4/1955 | Andrews | 224/482 |
| 4,221,354 A | | 9/1980 | Kempkers | 248/291.1 |
| 4,720,028 A | * | 1/1988 | Takemura et al. | 224/553 |
| 5,975,594 A | * | 11/1999 | Sandhu et al. | 292/173 |
| 6,513,687 B1 | * | 2/2003 | Siniarski | 224/282 |
| 6,622,886 B2 | * | 9/2003 | Kaupp et al. | 220/737 |
| 6,663,067 B2 | * | 12/2003 | Gordon | 248/294.1 |
| 6,705,579 B2 | * | 3/2004 | Yamada | 248/311.2 |
| 6,712,325 B2 | * | 3/2004 | Choi | 248/311.2 |

FOREIGN PATENT DOCUMENTS

| | | | | |
|---|---|---|---|---|
| DE | 118722 A1 | * | 9/1984 | .............. 224/282 |
| GB | 1 302 242 | | 1/1973 | |
| JP | 2512605 | | 7/1996 | |
| JP | 8-282385 | | 10/1996 | |

* cited by examiner

Primary Examiner—Jon Szumny
(74) Attorney, Agent, or Firm—Manabu Kanesaka

(57) ABSTRACT

A hook device includes a case member for supporting a hook main portion to be rotatable between a store position and a use position; a stopping portion attached to the case member for regulating the hook main portion at the use position with a predetermined opening angle; and an engaging portion provided to the hook main portion through an elastic member for engaging the stopping portion. The elastic member elastically deforms in a direction that the stopping portion engages the engaging portion when a load is applied to the hook main portion in a direction that the hook main portion opens.

6 Claims, 6 Drawing Sheets

HOOK DEVICE

BACKGROUND OF THE INVENTION AND RELATED ART STATEMENT

The present invention relates to a hook device to be disposed in a compartment of a vehicle or the like for suspending baggage therefrom. More particularly, the present invention relates to a hook device capable of being stored when the hook is not used.

In a hook device disposed in a compartment of a vehicle or the like, it is preferred that the hook device has a retractable structure so that the hook device does not become an obstacle when the hook device is not used. As such a retractable hook device, there has been known a hook device having a structure wherein a case member supports a hook main portion to be rotatable between a store position and a use position as disclosed in Japanese Patent Publication (Kokai) No. 8-282385.

In the retractable hook device described above, a stopping portion is provided to the case member for regulating a rotational range of the hook main portion. When the hook device is assembled, the hook main portion is assembled with the case member with a relative angle in a regular rotational range between the store position and the use position. When the hook device is disassembled, the hook main portion is disassembled from the case member in the regular rotational range. Accordingly, there is a restriction in which the hook device is assembled or disassembled with a specific angle. Usually, this restriction is insignificant in a case that the regular rotational range is large. However, in a case that the regular rotational range is set to be narrow according to a layout of the hook device, it is difficult to assemble or disassemble the hook device.

In the rotating-type retractable hook device described above, when a load is applied to the hook main portion, a rotational force is generated on the stopping portion at the case member side and a portion engaging the stopping portion at the hook main portion side. Therefore, a load limit of the hook device is determined by the strength of these portions, and it would result in a high cost to increase the strength. Therefore, it is desirable to provide a versatile structure that can appropriately adjust the load limit of the hook device according to various conditions such as a type of a vehicle and an installation location in a compartment.

In view of the problems described above, the present invention has been made, and an object of the invention is to provide a hook device wherein a hook main portion can be easily assembled with or disassembled from a case member without a restriction of a regular rotational range. In the hook device, it is possible to appropriately adjust a load limit according to various conditions.

Further objects and advantages of the invention will be apparent from the following description of the invention.

SUMMARY OF THE INVENTION

In order to attain the above objects, according to the first aspect of the invention, a hook device includes a hook main portion; a case member for supporting the hook main portion to be rotatable between a store position and a use position; a stopping portion provided to the case member for regulating the hook main portion at a predetermined angle in the use position; and an engaging portion provided to the hook main portion through an elastic member for engaging the stopping portion.

With this configuration, when the hook device is assembled with the case member with an angle deviated from a regular rotational range between the store position and the use position in a widely opened state, the elastic member appropriately deforms, so that the hook main portion can be rotated in the regular rotational range. Therefore, the hook main portion can be assembled with the case member with any relative angle to thereby facilitate the assembling work. Also, when the hook device is disassembled, the elastic member can deform to move the engaging portion to a position not to cause interference with the stopping portion by pushing with a finger or the like. Accordingly, the hook main portion can be opened wider than the rotational range regulated by the stopping portion to thereby facilitate the disassembling work.

According to the second aspect of the present invention, in the hook device described above, the elastic member elastically deforms in a direction that the stopping portion is maintained to engage the engaging portion when a load is applied to the hook main portion in a direction that the hook main portion opens. With this structure, it is possible to set a large load limit at which the elastic member buckles. In this case, in consideration of the direction of the rotational force applied to the hook main portion due to the load, the stopping portion and engaging portion may have cross sections so that when a load is applied to the hook main portion, the engaging portion is guided to further engage the stopping portion.

According to the third aspect of the invention, in the hook device described above, the elastic member elastically deforms in a direction that the stopping portion is released from the engaging portion when a load is applied to the hook main portion in the direction that the hook main portion opens. With this structure, when a load larger than the load limit is applied, the stopping portion is released from the engaging portion, thereby preventing plastic deformation or failure. In this case, in consideration of the direction of the rotational force applied to the hook main portion due to the load, the stopping portion and engaging portion may have cross sections so that when a load is applied to the hook main portion, the engaging portion is guided to move away from the stopping portion.

According to the fourth aspect of the invention, in the hook device described above, a spring may be provided for urging the hook main portion in an opening direction. Further, a latch mechanism may be provided for holding the hook main portion at a predetermined store position against the spring urging force. With this structure, the stopping portion regulates the hook main portion at the use position. Also, the latch mechanism holds the hook main portion at the store position, thereby making the hook device simple and handy.

DETAILED DESCRIPTION OF PREFERRED EMBODIMENT

Hereunder, embodiments of the present invention will be described in detail with reference to the accompanying drawings.

Figure 1:
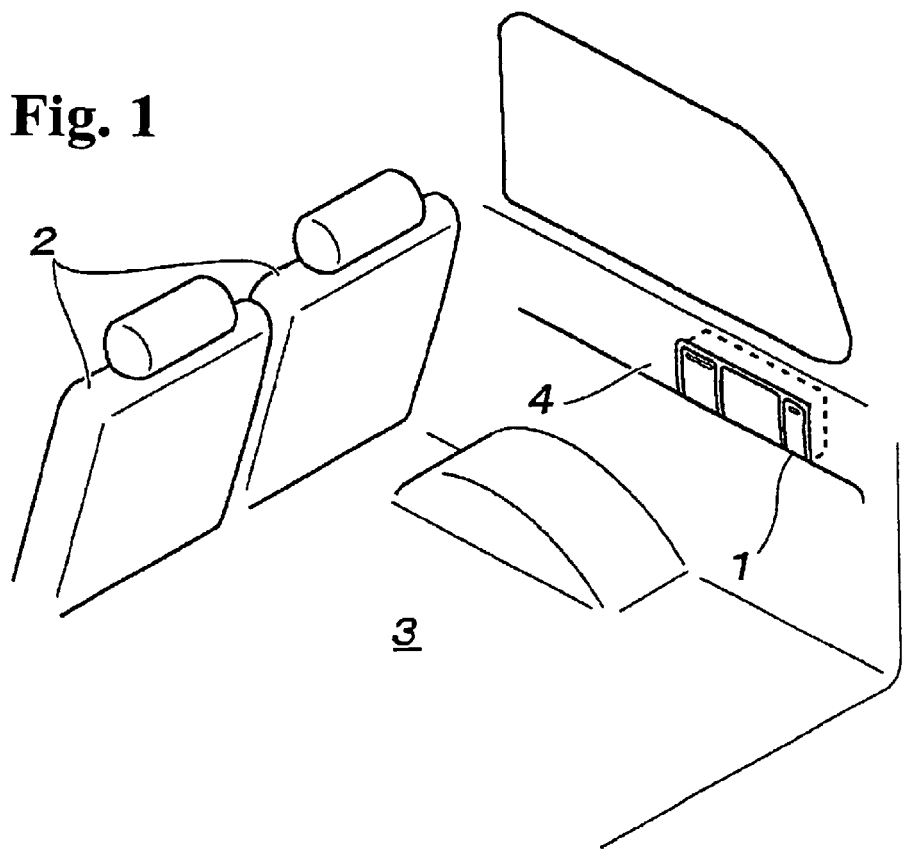
FIG. 1 is a perspective view showing a compartment in a vehicle where a hook device according to the present invention is applied.

FIG. 1 is a perspective view showing a compartment in a vehicle where the present hook device is applied. A hook device 1 according to the present invention is provided on a sidewall surface of a rear luggage space 3, and baggage such as a shopping bag is suspended from the hook device 1 to be held thereat. The hook device 1 is installed in an interior member 4 so that a front surface of the hook device 1 is exposed on the interior member 4. Incidentally, the hook device 1 is installed with other accessories such as a power plug.

Figure 2:
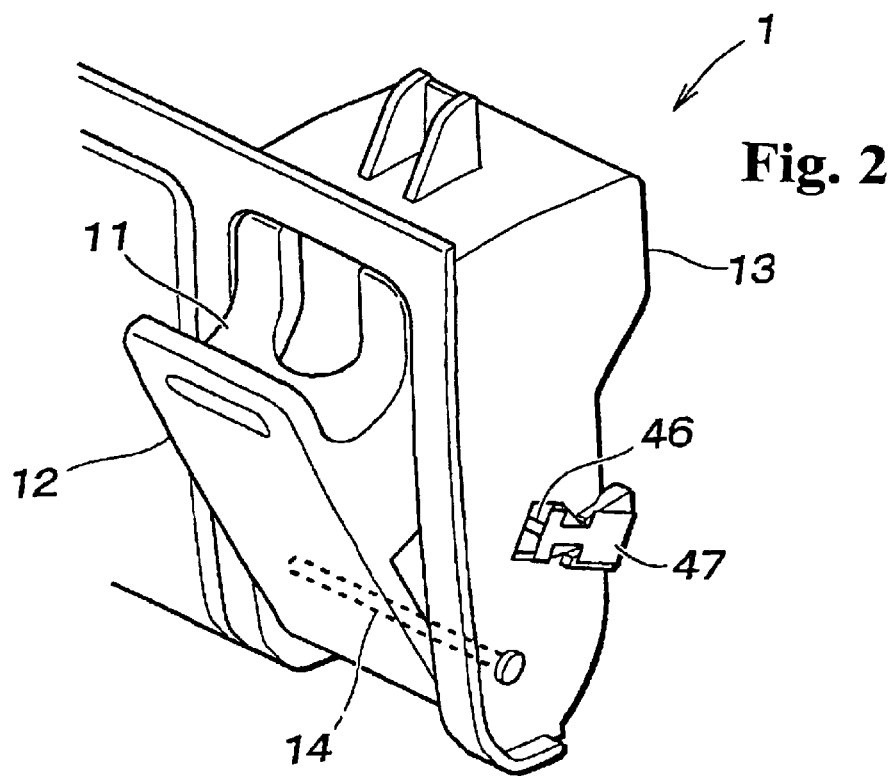
FIG. 2 is a perspective view showing the hook device according to the invention.

FIG. 2 is a perspective view showing the hook device according to the present invention. The hook device 1 includes a hook main portion 12 having a hook portion 11 for suspending baggage and a case member 13 for supporting the hook main portion 12 rotatably between a store position and a use position. A support shaft 14 for supporting the hook main portion 12 is provided at a lower portion of the hook main portion 12. The hook main portion 12 is tilted forward around the support shaft 14 so that the upper hook portion 11 projects outwardly for suspending the baggage. When the hook device 1 is not used, the hook main portion 12 is pushed in toward the store position, and a front surface of the hook main portion 12 is flush with a front surface of the case member 13.

Figure 3:
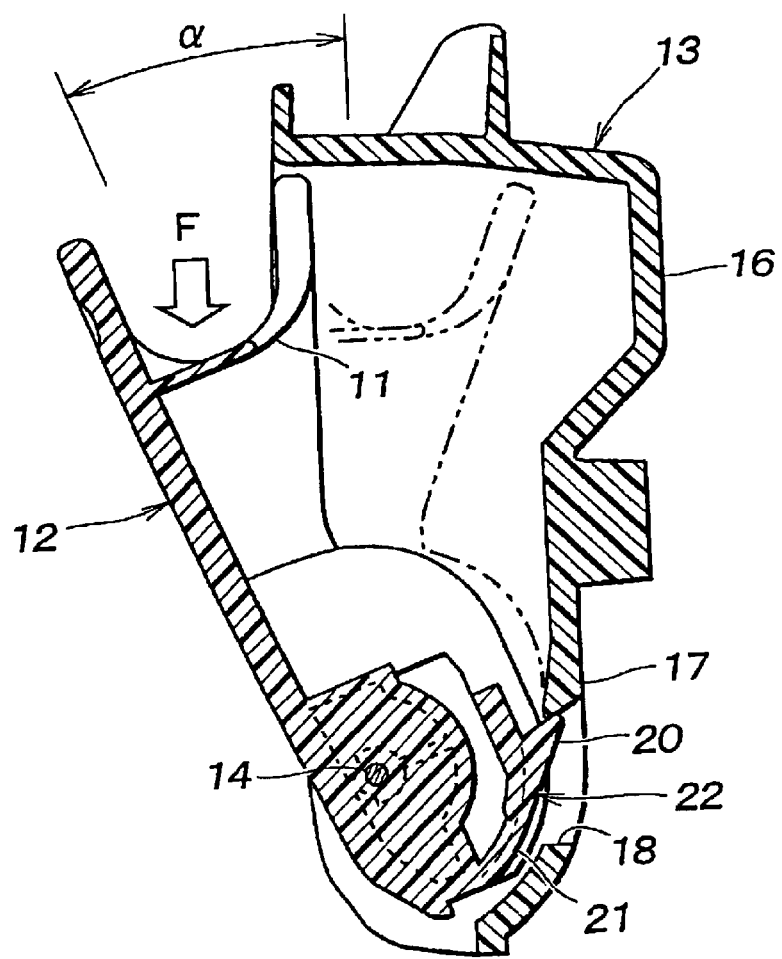
FIG. 3 is a sectional view showing the hook device shown in FIG. 2 in a use state.

FIG. 3 is a sectional view of the hook device shown in FIG. 2 in the use position. The case member 13 is formed in a box shape having a bottom and a front opening for storing the hook main portion 12. A bottom wall 16 includes a stopping portion 17 for regulating the hook main portion 12 in the use position at a predetermined opening angle. The stopping portion 17 is formed at an upper edge portion of an opening 18 provided in the bottom wall 16. The hook main portion 12 can be rotated in an angle range of about 20° at the store position where the front surface of hook main portion 12 is situated substantially vertically.

The hook main portion 12 is integrated with an elastic leg portion 22 including an engaging portion 20 at a front end thereof for engaging the stopping portion 17 and an elastic member 21 at a middle portion thereof. The elastic leg portion 22 extends along roughly a circular arc around the support shaft 14 from a lower end portion of the hook main portion 12 to the stopping portion 17. With this configuration, it is possible to make the elastic member 21 long. Therefore, even when the elastic member 21 is made of a relatively rigid material, it is still possible to obtain a sufficient elastic deformation. The elastic member 21 has a circular arc cross section so that when an external force is applied, the elastic member 21 deforms to thereby allow the engaging portion 20 to shift in a radial direction, i.e. an internal and external direction (a front and rear direction), of the support shaft 14.

In a state where the hook main portion 12 is positioned in a regular rotational range α between the store position and the use portion, when the elastic leg portion 22 is pushed inwardly with a finger or the like through the opening 18 of the case member 13, the engaging portion 20 moves to a position not to interfere with the stopping portion 17. Thus, the hook main portion 12 can be opened to an angle wider than the range regulated by the stopping portion 17, thereby facilitating a disassembling work.

Figure 4:
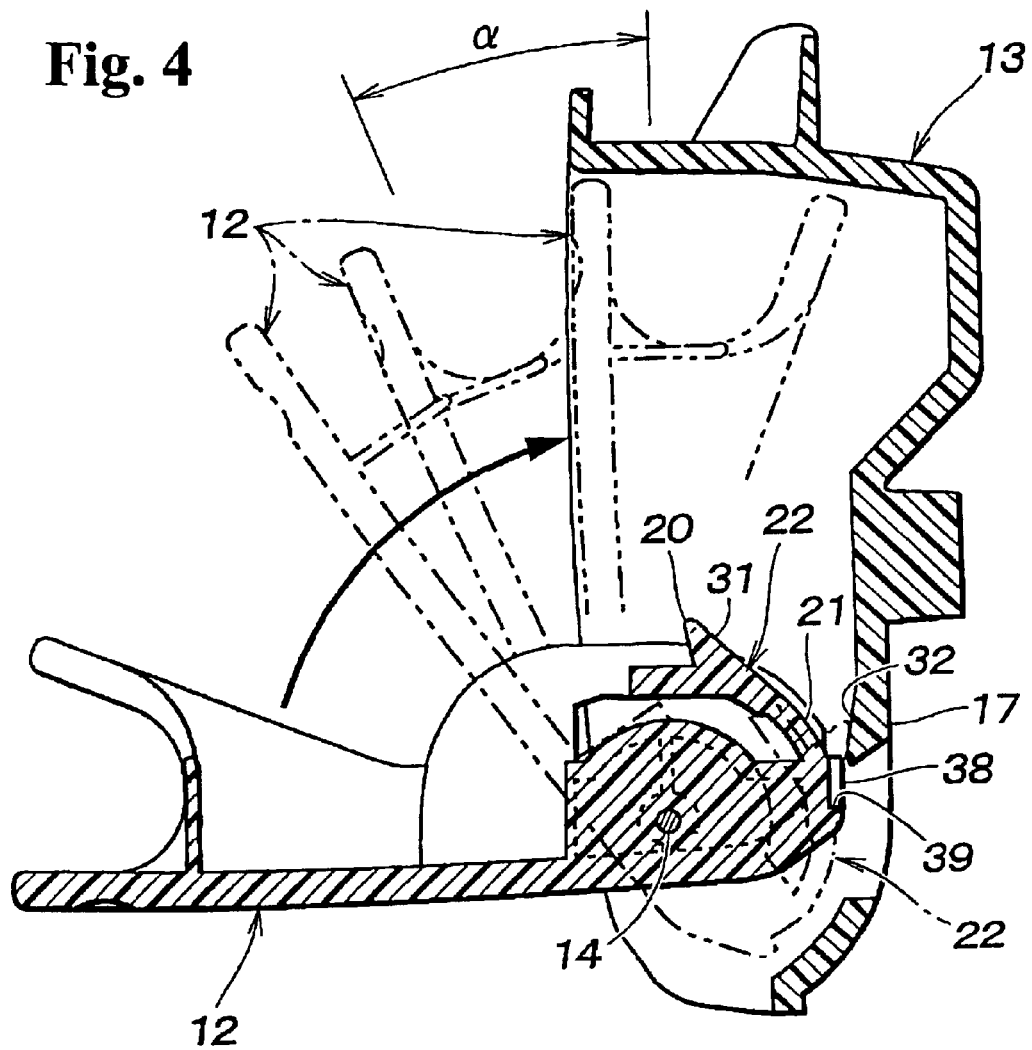
FIG. 4 is a sectional view showing the hook device shown in FIG. 3 in an assembled state.

FIG. 4 is a sectional view when the hook device shown in FIG. 3 is assembled. The hook main portion 12 is assembled to the case member 13 with a relative angle deviated from the regular rotational range α between the store position and the use position. From this state, when the hook main portion 12 is rotated in the closing direction, a side surface 31 of the engaging portion 20 abuts against a side surface 32 of the stopping portion 17. Then, the elastic leg portion 22 deforms inwardly and the engaging portion 20 passes over the stopping portion 17, so that the hook main portion 12 moves in the regular rotational range α. Accordingly, it is possible to assemble the hook main portion 12 with the case member 13 in any relative angle, thereby facilitating an assembling work.

A projecting portion 38 is provided on an inner surface of the sidewall of the case member 13. The projecting portion 38 abuts against a step portion 39 disposed at a lower end of the hook main portion 12 to regulate a position of the hook main portion 12. Also, in a state that the support shaft 14 is assembled, the hook main portion 12 can rotate up to a limit of the rotational range where the front surface of the hook main portion 12 substantially becomes horizontal, so that the hook main portion 12 can rotate in an angle range of 90° relative to the store position.

Figure 5:
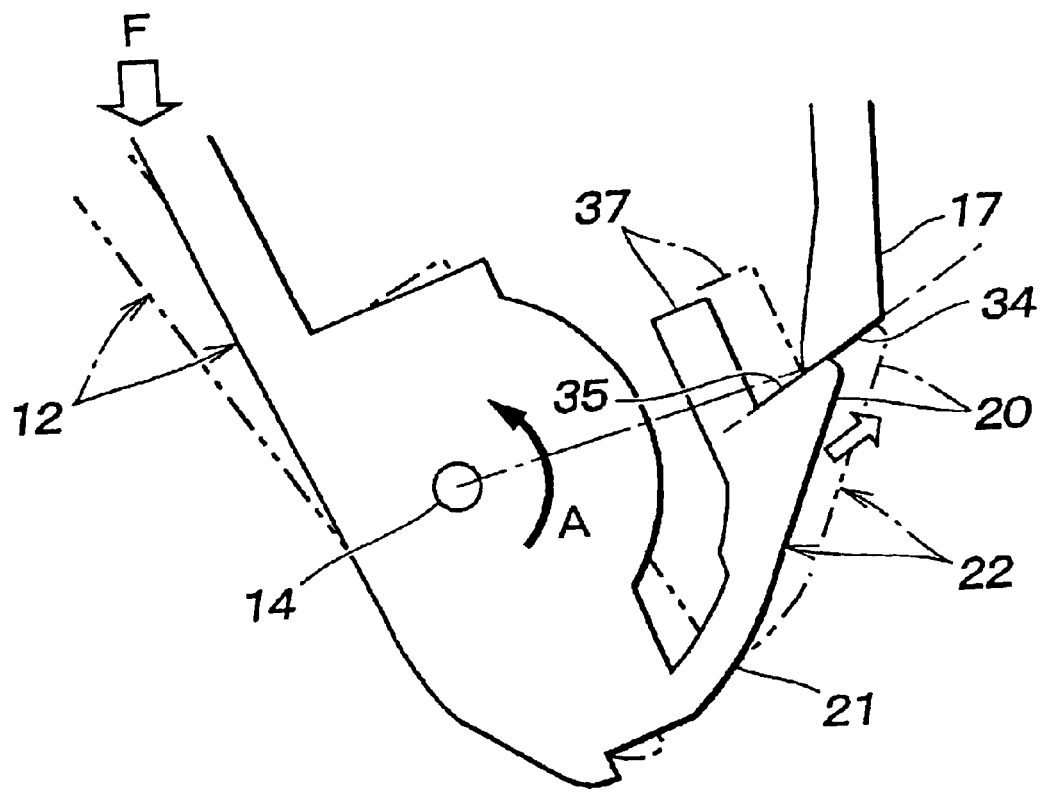
FIG. 5 is a schematic view for explaining an engaging state between a stopping portion and an engaging portion shown in FIG. 3.

FIG. 5 is a schematic view for explaining an engaging state between the stopping portion and the engaging portion shown in FIG. 3. When a load F is applied to the hook main portion 12 in the opening direction, the elastic member 21 of the elastic leg portion 22 elastically deforms in a direction that the engaging portion 20 maintains an engagement with the stopping portion 17. In other words, the stopping portion 17 and the engaging portion 20 have cross sections so that the engaging portion 20 is guided in the direction to further engage the stopping portion 17 when the load F is applied to the hook main portion 12 and a rotational force A is generated in an opening direction of the hook main portion 12.

More specifically, an engaging surface 34 of the stopping portion 17 and an engaging surface 35 of the engaging portion 20 have surfaces inclined relative to the radial direction of the support shaft 14. The surfaces are inclined downwardly toward an inner side, i.e. a front side, so that the rotational force A of the hook main portion 12 is converted into a force for deforming the elastic leg portion 22 outwardly. Therefore, when a large load is applied to the hook main portion 12, the engaging surface 35 of the engaging portion 20 is pressed against the engaging surface 34 of the stopping portion 17. Accordingly, the elastic leg portion 22 deforms toward outside along the engaging surface 34 of the stopping portion 17 in the direction that the engaging portion 20 shifts outside and further engages the stopping portion 17.

Incidentally, the structure for guiding the engaging portion 20 in the direction to further engage the stopping portion 17 is not limited to the embodiment shown in the drawings. It is possible to obtain such a function with a structure in which one of the engaging surfaces of the stopping portion 17 and the engaging portion 20 is formed in an inclined surface.

The engaging portion 20 shifts up to a position where the regulating portion 37 provided adjacent to the engaging portion 20 abuts against the stopping portion 17. At this position, the elastic leg portion 22 blocks the rotation of the hook main portion 12 against the rotational force A generated in the opening direction of the hook main portion 12 by the load F applied to the hook main portion 12. The elastic leg portion 22 is located approximately on a straight line connecting a base portion of the elastic leg portion 22 and the stopping portion 17. Therefore, mainly a compressive force is applied to the elastic leg portion 22, thereby obtaining a large load limit.

Figure 6:
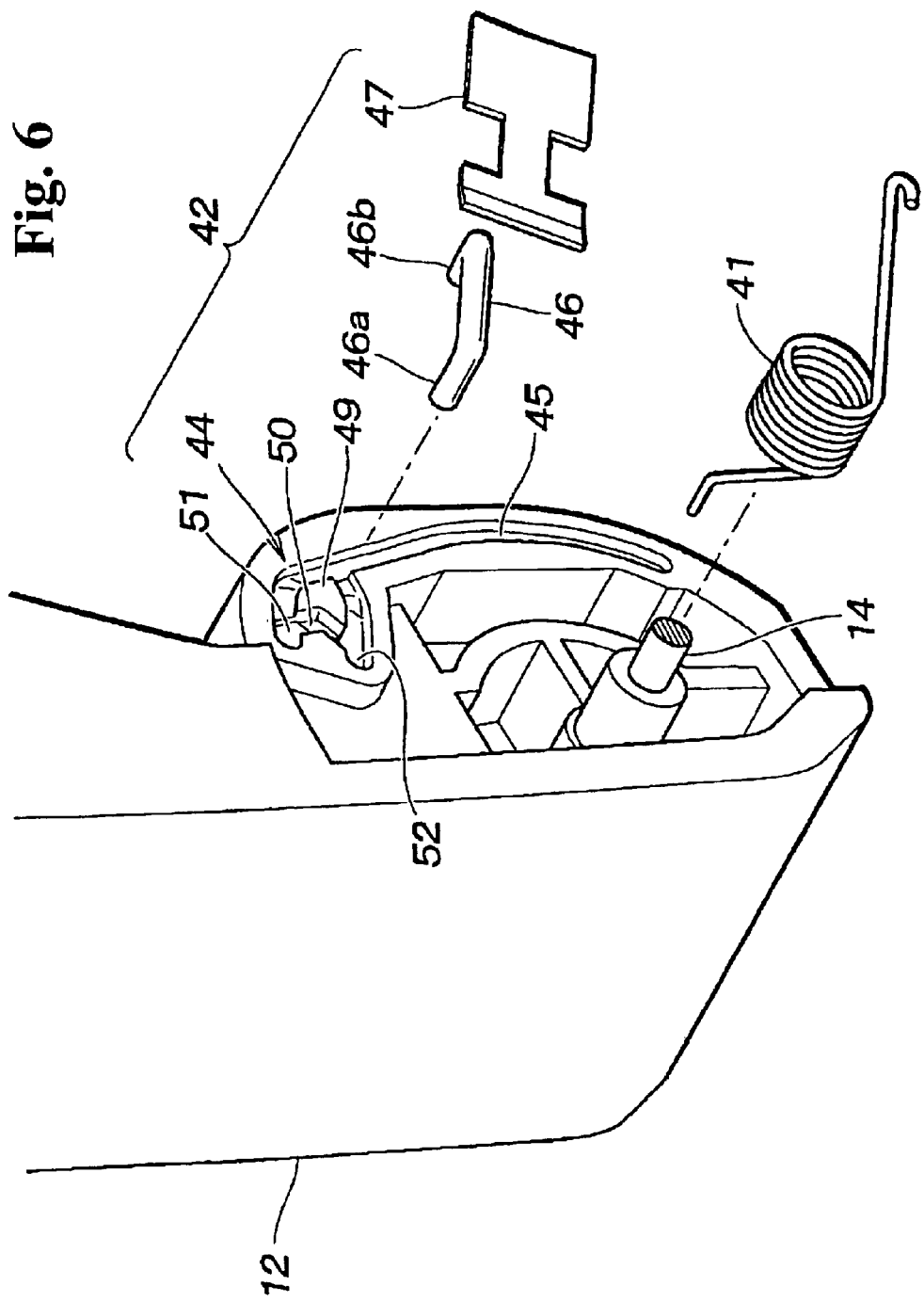
FIG. 6 is an exploded perspective view showing an essential part of the hook device shown in FIG. 2.

FIG. 6 is an exploded perspective view of an essential part of the hook device shown in FIG. 2. A torsion spring 41 urges the hook main portion 12 in the opening direction, and a latch mechanism 42 is provided for holding the hook main portion 12 in the store position against an urging force of the torsion spring 41. The latch mechanism 42 releases the hook main portion 12 when the hook main portion 12 is pushed in the closing direction from the store position so that the hook main portion 12 rotates to the use position by the spring urging force. When the hook main portion 12 is pushed in the closing direction from the use position, the latch mechanism 42 holds the hook main portion 12 at the store position. The torsion spring 41 has one end engaging the hook main portion 12 and the other end engaging the case member 13.

The latch mechanism 42 includes a cam groove 44 and a guiding groove 45 formed on a side surface of the hook main portion 12; a trace member 46 having a front end portion 46a fitted into the cam groove 44 and the guiding groove 45; and a leaf spring 47 for pressing the tracing member 46 from the outside to hold the trace member 46 in a state that a front end portion 46a always abuts against bottom surfaces of the cam groove 44 and guiding groove 45. The tracing member 46 is rotatably attached to the case member 13 by fitting a base end portion 46b into an attaching hole formed in the case member 13.

The cam groove 44 includes an engaging portion 50 corresponding to a concave portion in a heart island 49 having a heart shape contour; a switchback portion 51 at an approach route side; and a switchback portion 52 at a return route side. The switchback portions 51, 52 at the approach route side and return route side surround the heart island 49, and are connected to the guiding groove 45. The cam groove 44 includes step portions at a bottom surface thereof at appropriate portions.

At the store position of the hook main portion 12, the front end portion 46a of the trace member 46 is positioned at the engaging portion 50 of the cam groove 44. The torsion spring 41 urges the hook main portion 12 in the opening direction, so that the front end portion 46a of the trace member 46 engages the concave portion of the heart island 49 to thereby block the rotation of the hook main portion 12 in the opening direction. In this state, the step portions of the cam groove 44 prevent the front end portion 46a of the trace member 46 from entering the switchback portion 51 at the approach route side. Accordingly, when the hook main portion 12 is pushed in, the front end portion 46a of the trace member 46 enters the switchback portion 52 at the return route side. Then, when the pushing of the hook main portion 12 is stopped at a point where the rotation of the hook main portion 12 in the closing direction is blocked at the switchback portion 52 at the return route side, the hook main portion 12 rotates in the opening direction toward the use position by the urging force of the torsion spring 41. At this time, the forward end portion 46a of the trace member 46 enters the introducing groove 45 from the switchback portion 52 at the return route side.

On the other hand, when the hook main portion 12 is pushed in from the use position, the step portion of the latch mechanism 42 prevents the front end portion 46a of the trace member 46 from entering the switchback portion 52 at the return route side, and the front end portion 46a enters the switchback portion 51 at the approach route side from the guiding groove 45. When the pushing of the hook main portion 12 is stopped at a position where the rotation of the hook main portion 12 in the closing direction is blocked at the switchback portion 51 at the approach route side, the hook main portion 12 rotates in the opening direction by the urging force of the torsion spring 41. At this time, the step portion of the latch mechanism 42 prevents the front end portion 46a of the trace member 46 from returning to the guiding groove 45 from the switchback portion 51 at the approach route side. Accordingly, the front end portion 46a of the trace member 46 enters the engaging portion 50, and engages the concave portion of the heart island 49 to thereby hold the hook main portion 12 at the store position.

Figure 7:
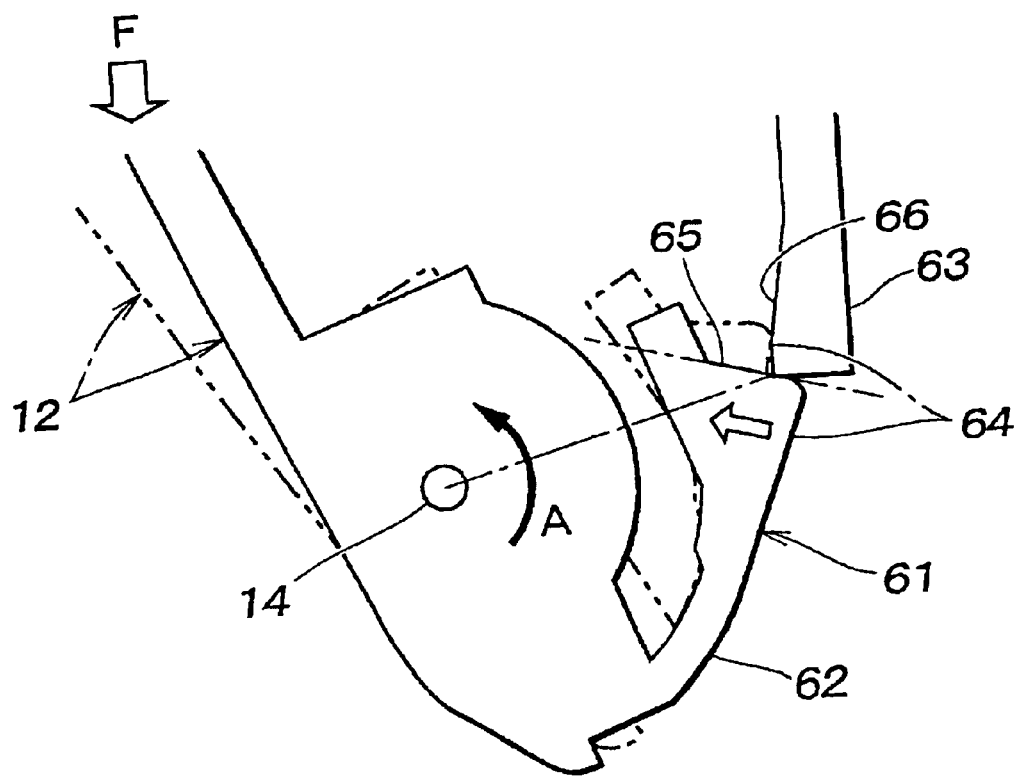
FIG. 7 is a schematic view showing another embodiment of a stopping portion and an engaging portion according to the present invention.

FIG. 7 is a schematic view showing another embodiment of the stopping portion and engaging portion according to the present invention. In this embodiment, when the load is applied to the hook main portion 12 in the opening direction, an elastic member 62 of an elastic leg portion 61 elastically deforms in a direction that an engaging portion 64 moves away from a stopping portion 63. In other words, the stopping portion 63 and the engaging portion 64 have cross sections such that the engaging portion 64 moves away from the stopping portion 63 when the rotational force A in the opening direction is generated to the hook main portion 12 by the load applied to the hook main portion 12.

Specifically, the engaging surface 65 of the engaging portion 64 has a surface inclined relative to the radial direction of the support shaft 14. The surface is inclined upwardly toward the inner side (the front side), so that the rotational force A of the hook main portion 12 is converted into a force for deforming the elastic leg portion 61 inwardly. Therefore, when the load is applied to the hook main portion 12, the engaging surface 65 of the engaging portion 64 is pressed against the stopping portion 63. Accordingly, the engaging portion 64 shifts inwardly, and the elastic member 62 deforms and moves toward the side surface 66 of the stopping portion 63 to thereby release the stopping portion 63 from the engaging portion 64. In the released state, the hook main portion 12 is in the state shown in FIG. 4, and is not used as the hook device. Thus, even when a load larger than the limit is applied, it is possible to prevent plastic deformation or failure. In the present structure, it is possible to adjust the load limit through an inclined angle of the engaging surface 65 of the engaging portion 64.

Incidentally, the structure for allowing the engaging portion 64 to move away from the stopping portion 63 is not limited to the embodiment shown in the drawing. It is also possible that both the stopping portion 63 and the engaging portion 64 may have inclined surfaces, or the stopping portion 63 may have an inclined surface.

As described above, according to the present invention, the engaging portion for engaging the stopping portion is formed on the elastic member. Therefore, it is possible to assemble or disassemble the hook main portion with or from the case member with any relative angle deviated from the regular rotational range between the store position and the use position, thereby greatly facilitating the assembling and disassembling works.

Further, it is easy to obtain different characteristics with a slight modification. For example, it is possible to obtain a configuration in which the elastic member deforms in the direction for maintaining the engaging state of the engaging portion to thereby strongly support when the load is applied to the hook main portion. It is also possible to obtain a configuration in which the elastic member deforms in the direction for releasing the engaging state of the engaging portion to thereby become unusable when the large load is applied to the hook main portion. Thus, it is possible to provide products having various characteristics suitable for various conditions at a low cost.

While the invention has been explained with reference to the specific embodiments of the invention, the explanation is illustrative and the invention is limited only by the appended claims.

What is claimed is:

1. A hook device for suspending an object, comprising:
   a case member having a stopping portion located at a rear side of the case member,
   a hook main portion disposed in the case member to be rotatable between a store position and a use position, and having an upper portion, a lower portion rotationally attached to the case member, and an elastic member projecting rearwardly and upwardly from the lower portion to the upper portion, and
   an engaging portion provided at the elastic member of the hook main portion to engage the stopping portion so that the hook main portion is stopped at the use position with a predetermined open angle, at least one of said stopping portion and said engaging portion having an inclined surface so that when a load is applied to the hook main portion in the use position in a direction such that the hook main portion further opens, the elastic member is urged in a direction that the stopping portion further engages the engaging portion to thereby prevent further opening of the hook main portion.

2. The hook device as claimed in claim 1, further comprising urging means attached to the case member for urging the hook main portion in a direction that the hook main portion opens, and a latch mechanism for holding the hook main portion at a predetermined store position against an urging force of the urging means.

3. The hook device as claimed in claim 1, wherein said hook main portion has a space between the bottom portion and the elastic member so that the elastic member is deformable toward the bottom portion.

4. The hook device as claimed in claim 1, wherein said engaging portion has an inwardly inclined surface relative to a radial line extending from a rotational axis of the hook main portion so that a rotational force of the hook main portion beyond the use portion is converted to a force for deforming the hook main portion outwardly.

5. The hook device as claimed in claim 4, wherein said stopping portion and said engaging portions have similar inwardly inclined surfaces.

6. The hook device as claimed in claim 4, wherein said hook main portion includes a hook portion at a rear side of the upper portion.

* * * * *